US012719365B2

(12) United States Patent
Michal

(10) Patent No.: US 12,719,365 B2
(45) Date of Patent: Aug. 25, 2026

(54) POWER CONVERSION CIRCUIT WITH A TANK CAPACITOR FOR BOOSTING OUPUT POWER

(71) Applicant: STMicroelectronics (Alps) SAS, Grenoble (FR)

(72) Inventor: Vratislav Michal, Fontanil-Cornillon (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 215 days.

(21) Appl. No.: 18/485,634

(22) Filed: Oct. 12, 2023

(65) Prior Publication Data

US 2024/0136927 A1 Apr. 25, 2024

(30) Foreign Application Priority Data

Oct. 17, 2022 (EP) .................................... 22306569

(51) Int. Cl.
*H02M 3/158* (2006.01)
*H02M 1/088* (2006.01)
*H02M 1/10* (2006.01)

(52) U.S. Cl.
CPC ........... *H02M 3/158* (2013.01); *H02M 1/088* (2013.01); *H02M 1/10* (2013.01)

(58) Field of Classification Search
CPC .... H02M 3/155; H02M 3/1557; H02M 3/156; H02M 3/1566; H02M 3/158; H02M 3/1582; H02M 3/1588; H02M 3/1584–1586; H02M 1/009; H02M 1/0074; H02M 1/0077; H02M 1/0083; H02M 1/0093; H04B 2215/069
See application file for complete search history.

(56) References Cited

U.S. PATENT DOCUMENTS

2014/0198536 A1 7/2014 Fu et al.

FOREIGN PATENT DOCUMENTS

CN 101145728 * 3/2008 .............. H02M 3/10
CN 101145728 A * 3/2008
JP 2022136679 A 9/2022

OTHER PUBLICATIONS

Jiang, Maoh-Chin et al., "Analysis and design of a novel three-phase soft-switching rectifier", Industrial Electronics and Applications (ICIEA), 2011 6th IEEE Conference on, IEEE, Jun. 21, 2011, pp. 1197-1202 (Year: 2011).*
Jiang, Maoh-Chin et al., "A novel single-phase soft-switching unipolar PWM rectifier", TENCON 2011—2011 IEEE Region 10 Conference, IEEE, Nov. 21, 2011, pp. 843-847 (Year: 2011).*

(Continued)

*Primary Examiner* — Monica Lewis
*Assistant Examiner* — Ularislao Cordova
(74) *Attorney, Agent, or Firm* — Slater Matsil, LLP

(57) ABSTRACT

A power conversion circuit includes a first branch having a first switch and a second switch electrically connected to each other in series between a first node and a second node. An inductive element has a first terminal connected to a mid-point of the first and second switches. A capacitor has a first electrode coupled to the first node. A third node is configured to receive a first voltage, and the first voltage is referenced to the second node. A third switch is configured to electrically connect the third node to a second terminal of the inductive element.

20 Claims, 12 Drawing Sheets

(56) References Cited

OTHER PUBLICATIONS

Apollo, Charalambous et al., "Controlling the output voltage frequency response of the auxiliary commutated pole inverter", IECON 2016, 42nd Annual Conference of the IEEE Industrial Electronics Society, IEEE, Oct. 23, 2016, pp. 3305-3310.
Jiang, Maoh-Chin et al., "A novel single-phase soft-switching unipolar PWM rectifier", TENCON 2011—2011 IEEE Region 10 Conference, IEEE, Nov. 21, 2011, pp. 843-847.
Jiang, Maoh-Chin et al., "Analysis and design of a novel three-phase soft-switching rectifier", Industrial Electronics and Applications (ICIEA), 2011 6th IEEE Conference on, IEEE, Jun. 21, 2011, pp. 1197-1202.
Pereira, Thiago et al., "Minimizing Losses Induced by Parasitic Winding Capacitance in Electric Drives by Means of Soft-Switching GaN-Based Arcp," IEEE Oct. 11, 2020, pp. 3704-3711.
Protiwa, et al., "A 20 KVA Auxiliary Resonant Commutated Pole Converter, Design and Practical Experiences", EPE '95: 6th European Conference on Power Electronics and Applications, Sevilla, Sep. 19-21, 1995; Brussels, EPE Association, B, vol. 2, Sep. 19, 1995, 6 pages.
R.W., De Doncker et al., "The auxiliary resonant commutated pole converter", Conference Record of the Industry Applications Society Annual Meeting, Seattle, Oct. 7-12, 1990; New York, IEEE, US, vol. 2, Oct. 7, 1990, pp. 1228-1235.
Steigerwald, Robert L "Power Electronic Converter Technology", Proceedings of the IEEE, New York, US, vol. 89, No. 6, Jun. 1, 2001, 8 pages.
Zhou, Wenzhi et al., "Elimination of Overshoot and Oscillation in the Auxiliary Branch of a SiC Auxiliary Resonant Commutated Pole Inverter (ARCPI)", 2019 10th International Conference on Power Electronics and ECCE Asia (ICPE 2019, ECCE Asia), The Korean Institute of Power Electronics, May 27, 2019, 7 page.
Toba, Akio et al., "Auxiliary Resonant Commutated Pole Inverter Using Two Internal Voltage-Points of DC Source," IEEE Transactions on Industrial Electronics, vol. 45, No. 2, Apr. 1998, 7 pages.
Wei, Jian et al., "A Novel Zero-Voltage-Transition Snubber Cell for Dual Buck Half Bridge Inverter," 2018 21st International Conference on Electrical Machines and Systems (ICEMS) Oct. 7-10, 2018 1 Jeju, Korea, 5 pages.

* cited by examiner

POWER CONVERSION CIRCUIT WITH A TANK CAPACITOR FOR BOOSTING OUPUT POWER

CROSS-REFERENCE TO RELATED APPLICATIONS

This application claims the priority benefit of European patent application number EP 22306569.9, filed on Oct. 17, 2022, entitled "POWER CONVERSION CIRCUIT", which is hereby incorporated by reference to the maximum extent allowable by law.

TECHNICAL FIELD

The present disclosure generally concerns power conversion circuits and related methods, and particular embodiments relate to power conversion circuits using a tank capacitor for instantaneously boosting output power.

BACKGROUND

A large variety of power conversion circuits are widely known. Power conversion circuits (which may be referred to more generally as power converters) can convert alternating current (AC) into direct current (DC) and vice versa. Moreover, some power conversion circuits can change the voltage or frequency of the current. Power conversion circuits can be as simple as a transformer or can be a more complex system, such as a resonant converter.

SUMMARY

In various embodiments, the present disclosure provides improved power conversion circuit and methods which at least partially overcome some of the drawbacks of conventional power conversion circuits.

In at least one embodiment, a power conversion circuit is provided that includes a first branch including a first switch and a second switch electrically connected to each other in series between a first node and a second node. An inductive element has a first terminal connected to a mid-point of the first and second switches. A capacitor has a first electrode coupled to the first node. A third node is configured to receive a first voltage, with the first voltage being referenced to the second node. A third switch is configured to electrically connect the third node to a second terminal of the inductive element.

In at least one embodiment, a method is provided that includes: applying a first voltage to a third node of a power conversion circuit, the power conversion circuit including a first branch having a first switch and a second switch electrically coupled to one another in series between a first node and a second node, an inductive element having a first terminal connected to a mid-point of the first and second switches, and a capacitor having a first electrode coupled to the third node, wherein the first voltage is referenced to the second node; and electrically connecting, by a third switch, the third node to a second terminal of the inductive element.

According to at least one embodiment, the circuit further comprises a second branch including a fourth switch and a fifth switch electrically connected to each other in series between the first node and the second node.

According to at least one embodiment, a mid-point of the fourth and fifth switches of the second branch is connected to the second terminal of the inductive element.

According to at least one embodiment, during a first operating phase, the third switch is ON and a first and a second step alternate at a first frequency.

According to at least one embodiment, the first switch is OFF and the second switch is ON during the first step; and
- the first switch is ON and the second switch is OFF during the second step.

According to at least one embodiment:
- during a second operating phase comprising a third step and a fourth step, the third switch is OFF; and
- the first and second operating phases alternate at a frequency lower than the first frequency.

According to at least one embodiment, the first and second switches are controlled in pulsed width modulated mode.

According to at least one embodiment:
- during the third step, the first switch is ON and the second switch is OFF; and
- during the fourth step, the first switch is OFF and the second switch is ON.

According to at least one embodiment:
- during the first operating phase, the fourth and fifth switches are OFF;
- during the second operating phase, the first and second switches are OFF;
- the fourth switch is ON and the fifth switch is OFF during the third step; and
- the fifth switch is ON and the fourth switch is OFF during the fourth step.

According to at least one embodiment, the inductive element is coupled by an output switch to an output node.

According to at least one embodiment, the output switch is:
- OFF during the first operating phase; and
- ON during the second operating phase.

According to at least one embodiment, the circuit further comprises a feedback circuit, connected to the output node, and configured to maintain a constant current in the inductive element during the second operating phase by comparing a voltage or a current at the output node to a reference and provide a control signal to the first and second switches.

According to at least one embodiment, the circuit further comprises a feedback circuit, connected to the output node, and configured to maintain a constant current in the inductive element during the second operating phase by comparing a voltage or a current at the output node to a reference and provide a control signal to the fourth and fifth switches.

According to at least one embodiment, the capacitor is coupled to the third node.

According to at least one embodiment, the capacitor is coupled to a reference potential.

According to at least one embodiment, the second node is connected to a reference potential.

According to at least one embodiment, the circuit further comprises a capacitance coupling the output node to the reference potential.

In at least one embodiment, an electronic device is provided that includes a power source configured to supply a first voltage, a load, and a power conversion circuit. The power conversion circuit includes a first branch including a first switch and a second switch electrically connected to each other in series between a first node and a second node. An inductive element has a first terminal connected to a mid-point of the first and second switches. A capacitor has a first electrode coupled to the first node. A third node is configured to receive a first voltage, with the first voltage being referenced to the second node. A third switch is configured to electrically connect the third node to a second terminal of the inductive element. The power source is configured to apply the first voltage to the third node, and the load is connected to an output node of the power conversion circuit.

According to at least one embodiment, the power source comprises a battery.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may have similar or identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms “front”, “back”, “top”, “bottom”, “left”, “right”, etc., or to relative positional qualifiers, such as the terms “above”, “below”, “higher”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

Figure 1:
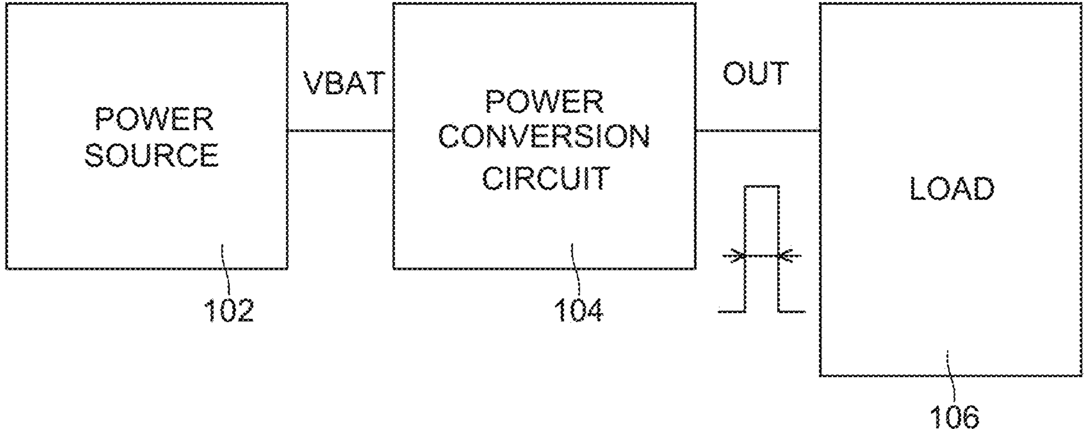
FIG. 1 is a schematic view of an electronic device in accordance with some embodiments of the present disclosure.

FIG. 1 is a schematic view of an example of electronic device in accordance with some embodiments, and in which some embodiments may be applied or incorporated into.

The electronic device of FIG. 1 comprises a power source 102 (POWER SOURCE) configured to supply a first voltage VBAT to a power conversion circuit 104 (POWER CONVERSION CIRCUIT). The power conversion circuit 104 is coupled to a load 106 (LOAD) and is configured to supply the load 106 with an output or powering signal OUT.

Depending on the application, the electronic circuit comprises other components and elements not shown, which can also be powered from the power source 102 and/or from the power conversion circuit 104.

The voltage or current (power) of the output signal OUT is, for example, greater than the first voltage or current (power) VBAT supplied by the power source 102.

According to some embodiments, the power conversion circuit is a switched mode power supply (SMPS) or DC/DC convertor. The DC/DC convertor is for example controlled by a duty cycle D.

According to an example of application, the load is composed of one or several laser sources, such as a vertical cavity surface emitting lasers (VCSEL). In such an application, the output signal OUT is provided as voltage or current pulses. Typically, the instantaneous powering voltage, current or power of the laser source is higher than the voltage, current or power that can be instantaneously provided by the power source 102, and the duration of the powering pulse is in the order of magnitude of the microsecond, generally several microseconds or tens of microseconds.

The energy drawn by the load 106 from the power conversion circuit 104 during the powering pulses is therefore important. Depending on the power capability of the power source 102, this energy need may result in collapsing the power source 102 absent the advantages provided by some embodiments of the present disclosure as will be discussed in further detail herein. In particular, in applications where the power source 102 comprises a battery, a conventional power conversion circuit could be unable to deliver the high power required by the load 106 without collapsing the battery voltage. However, as discussed in further detail herein, the power conversion circuit 104 in accordance with embodiments of the present disclosure overcomes these disadvantages as described in further detail herein.

Furthermore, the sequence of power pulses of the laser source does not authorize long intervals between two pulses, which results in a need or desire, for the power conversion circuit, to fast recover additional energy from the power source, in order to power next laser pulse. Typically, the duty cycle of the powering pulse of a laser source is comprised between 5 and 40 percent, preferably between 15 and 25 percent.

According to the disclosed embodiments, the power conversion circuit 104 comprises a tank capacitor. Providing a power conversion circuit with a large (greater than several tenth of μF) input battery decoupling capacitor is usual. However, the tank capacitor of the disclosed embodiments is coupled only to the input of the switched mode power supply. More particularly, even a relatively small tank capacitor helps the power source 102 to provide sufficient energy to the switched mode power supply circuit to generate sufficient energy for the laser pulse. As example, the instantaneous power generated at the output can be 2 to 5 times higher than the power capability of the power source 102.

In the disclosed embodiments, the tank capacitor helps in reaching a power (voltage and/or current) level at the output OUT, which may be higher than the instantaneous power, (voltage and/or current) for example the nominal power (voltage and/or current) level VBAT, provided by the power source 102, which is typically a battery.

Further details of the power conversion circuit 104 are provided below, and power conversion circuits in accordance with any of the various embodiments of the present disclosure may be utilized in the electronic device shown in FIG. 1. The electronic device illustrated in FIG. 1 may be incorporated into a single electronic chip, in some embodiments, and in other embodiments one or more of the power source 102, power conversion circuit 104, or load 106 may be physically separate from the others (e.g., provided on a separate electronic chip within the electronic device). The electronic device may be any electronic device, and in some embodiments may be a smartphone, a computer, a laptop computer, a tablet or mobile computing device, a vehicle, or any other electronic device.

Figure 2:
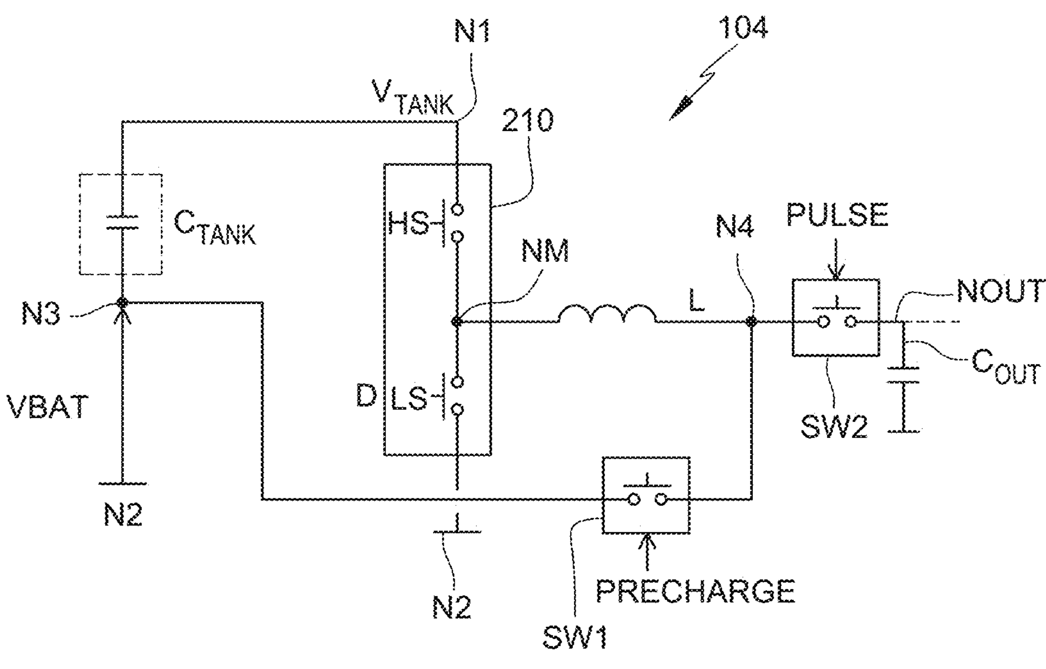
FIG. 2 is a schematic view of a power conversion circuit in accordance with some embodiments.

FIG. 2 is a schematic view of a power conversion circuit according to one or more embodiments of the present disclosure.

According to the example of FIG. 2, the power conversion circuit 104 comprises a branch 210, otherwise said a half-bridge 210, comprising a first switch HS (high-side switch) and a second switch LS (Low-side switch) in series between a first node N1 and a second node N2, and an inductive element L having a first terminal connected to a mid-point NM of the first HS and second LS switch. Switches HS, LS and inductive element L form a switched mode power supply circuit. The inductive element L is an inductor, for example, a coil. Node N2 is for example coupled, and in some embodiments directly electrically connected, to a reference potential such as an electrical ground.

According to the disclosed embodiments, the power conversion circuit 104 further comprises a capacitor CTANK having a first electrode coupled, and in some embodiments directly electrically connected, to node N1 of voltage $V_{TANK}$.

According to the example of FIG. 2, a second electrode of the capacitor CTANK is coupled, and in some embodiments directly electrically connected, to a third node N3 configured to receive the power supply voltage VBAT. Voltage VBAT is referenced to the same potential as node N2 in some embodiments.

According to the disclosed embodiments, the node N3 of application of the power supply voltage VBAT is coupled, by a switch SW1, controlled by a signal PRECHARGE, to a second terminal N4 of the inductive element L.

The second terminal N4 of the inductive element L is coupled by an output switch SW2, controlled by a signal PULSE to an output node NOUT, providing the output signal OUT. In an example implementation of the power conversion circuit 104 of FIG. 2, the output node NOUT is coupled, or in some embodiments directly electrically connected, for example, to a decoupling capacitor $C_{OUT}$.

The operation of the circuit of FIG. 2 alternates CTANK capacitor pre-charge phases of charging capacitor CTANK from the power source and discharge phases (otherwise called output current generation phases, powering TON phases or powering phases) generating output current or voltage (energy) from the output node NOUT, for example to a load. Both phases use the half-bridge 210 and the inductive element L in a switched mode power supply operation, alternating steps of energy accumulation in the inductive element L and steps of energy restitution to either the capacitor CTANK during pre-charge phases or to the load 106 in output current generation phases.

During pre-charge phases, switch SW1 is ON and switch SW2 is OFF. The power convertor 104 operates as a boost DC/DC convertor from VBAT to $V_{TANK}$. Thus, $V_{TANK}$>VBAT, more particularly $V_{TANK}$=VBAT/(1-D). During output current generation phases, switch SW1 is OFF and switch SW2 is ON. The power convertor 104 operates as a buck DC/DC convertor from $V_{TANK}$ to NOUT. Thus, $V_{TANK}$>VBAT, more particularly a voltage VOUT at the output node is VOUT=D·$V_{TANK}$.

According to the example of FIG. 2, the potential energy $E_{discharge}$ stored in the capacitor CTANK and available for discharge can be formulated according to the following equation 1:

$$E_{discharge} = \frac{1}{2} C_{TANK} \left( V^2_{TANK(max)} - V^2_{TANK(min)} \right) \tag{1}$$

where $C_{TANK}$ is the capacity of the capacitor CTANK, $V_{TANK(max)}$ is the voltage $V_{TANK}$ between node N1 and node N2 at the beginning of the discharge phase, and $V_{TANK(min)}$ is the voltage between the first and second nodes N1, N2 at the end of the discharge phase. It can be seen that the available energy $E_{discharge}$ increases with square of $V_{TANK(max)}$. The energy storage increases or similarly the decrease of the $C_{TANK}$ value and therefore $C_{TANK}$ capacitor volume is obtained by increasing $V_{TANK(max)}$.

The energy delivered by the capacitor CTANK during a discharge phase can be formulated according to the following equation 2:

$$E_{OUT} = V_{OUT} I_{OUT} T_{ON} \tag{2}$$

where VOUT is the voltage provided at the output NOUT during the discharge phase, $I_{OUT}$ the current drawn from the output node NOUT by the load during the discharge phase, and $T_{ON}$ the duration of the discharge phase. Ideally, $E_{discharge}$=$E_{OUT}$. It leads to the following equation 3 and equation 4 which are valid for $V_{TANK(min)}$>$V_{OUT}$:

$$T_{ON} = \frac{1}{2} \frac{C_{TANK}\left(V_{TANK(max)}^2 - V_{TANK(end)}^2\right)}{V_{OUT} I_{OUT}} \quad (3)$$

$$C_{TANK} = \frac{2 \cdot T_{ON} V_{OUT} I_{OUT}}{\left(V_{TANK(max)}^2 - V_{TANK(min)}^2\right)} \quad (4)$$

An advantage of the disclosed embodiments is that, with a tank capacitor $C_{TANK}$ at the input side of the power conversion circuit 104, higher voltage variations are allowed across the TANK capacitor when compared to the voltage variations of capacitor used as input decoupling capacitor at the battery terminal. Higher voltage variation on the TANK capacitor electrodes signifies that capacitor is absorbing and delivering a larger amount of the energy between charging and discharging phases. Higher voltage variation on $C_{TANK}$ leads therefore to a better usage of the capacitor volume, i.e. better capacitor-volume efficiency, when compared to capacitors with a small voltage variation (ripple) used to decoupling input e.g. battery voltage.

Another advantage of the power conversion circuit 104 of FIG. 2 is that during the output current generation phases, the capacitor CTANK and the power source 102 are in series. This has several advantages that will be described in more detail below.

Figure 3:
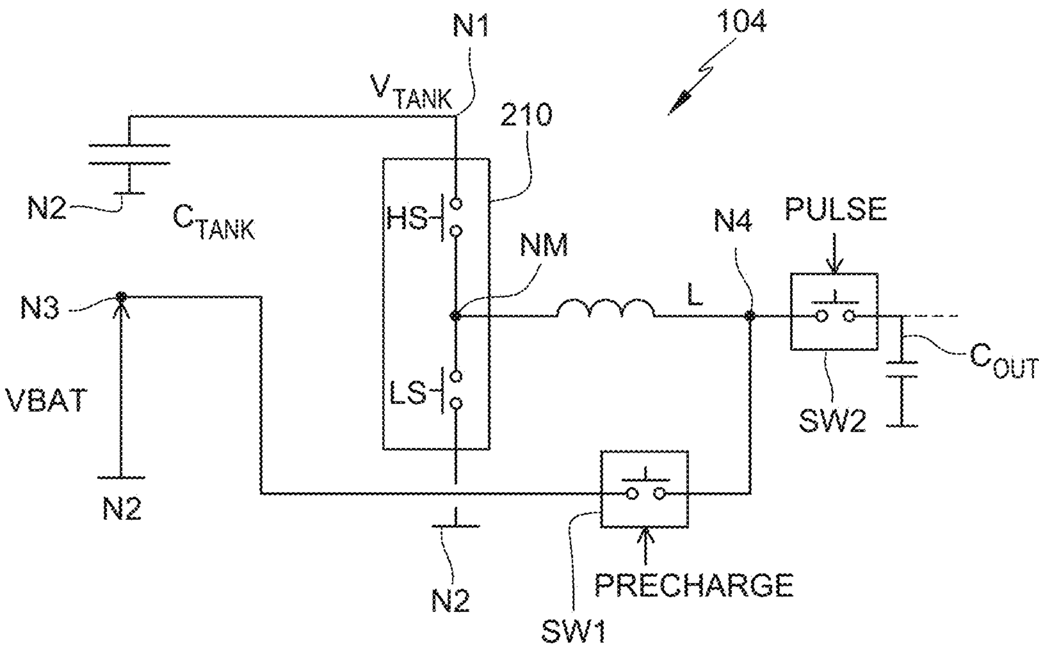
FIG. 3 is a schematic view of a different implementation of a power conversion circuit in accordance with some embodiments.

FIG. 3 is a schematic view of a different implementation of the power conversion circuit according to some embodiments of the present disclosure.

The power conversion circuit 204 of FIG. 3 is similar to the power conversion circuit 104 of FIG. 2 except that the second electrode of the capacitor CTANK is coupled, and in some embodiments directly electrically connected, to the reference node N2 instead of to the third node N3 of the power source output.

While the power conversion circuit 104 of FIG. 2 may in some cases be a preferred embodiment due to the serial connection of the power source and of the capacitor CTANK, the power conversion circuit 204 of FIG. 3 presents alternative embodiments allowing also efficient alternation of phases for storing energy in capacitor CTANK and for powering the load using the same inductive element L.

The power conversion circuit 204 illustrated in FIG. 3 has the bottom plate of CTANK connected to node N2, e.g. noiseless ground GND. While this node is a stable voltage, it prevents from adding noise to N1 node voltage $V_{TANK}$. This coupling can occur in the power conversion circuit 104 illustrated in FIG. 2, where e.g. power source noise can be added to the node N1.

An advantage of the power conversion circuit 104 of FIG. 2 containing the capacitor bottom plate connected to the power source terminal 102 VBAT is that, for a given N1 node voltage $V_{TANK}$, CTANK capacitor voltage is decreased by VBAT. Due to a nonlinear C(V) characteristic of high-density ceramic capacitors called capacitor derating, lower CTANK voltage results in a higher capacitance of CTANK. This is because lower DC bias voltage of CTANK implies higher CTANK capacitance. Inversely, it allows to decrease CTANK value and thus reduce volume and implementation cost of the power conversion circuit 104. In some embodiments, the reduction factor is two. Advantages of having a higher value CTANK appears from the previous equation for $E_{discharge}$ (1). For sake of clarity, the value of the capacitance CTANK mentioned in foregoing and following equations is considered constant, i.e. voltage independent.

Another advantage of embodiments according to FIG. 2, is that the charging current drawn from the power source required to establish given voltage VTANK (i.e. between nodes N1 and N2) is lower (and equal to D*$I_{COIL}$ through the inductive element L), compared to the variant of FIG. 3, where battery current is $I_{COIL}$ as usual for boost DC/DC converters.

During the discharge phase, for the power conversion circuit 104 of FIG. 2 where CTANK is connected to VBAT (N3), one portion of the output energy $E_{discharge}$ is supplied by the capacitor CTANK, and a second portion of the energy is delivered by power source by the first voltage VBAT. This decreases the difference between currents drawn from the power source 102 during the pre-charge phase (TOFF) and discharging phase TON. This results in lowering of the battery voltage and current ripple. More particularly, in the power conversion circuit 104 of FIG. 2, the battery current is D*$_{COIL}$, whereas in the power conversion circuit 204 of FIG. 3, the CTANK bottom terminal connected to GND (N2) results in zero battery current during the discharge phase. $I_{COIL}$ current during the discharge phase is equal to the output current delivered by NOUT to the load.

Figures 4, 5:
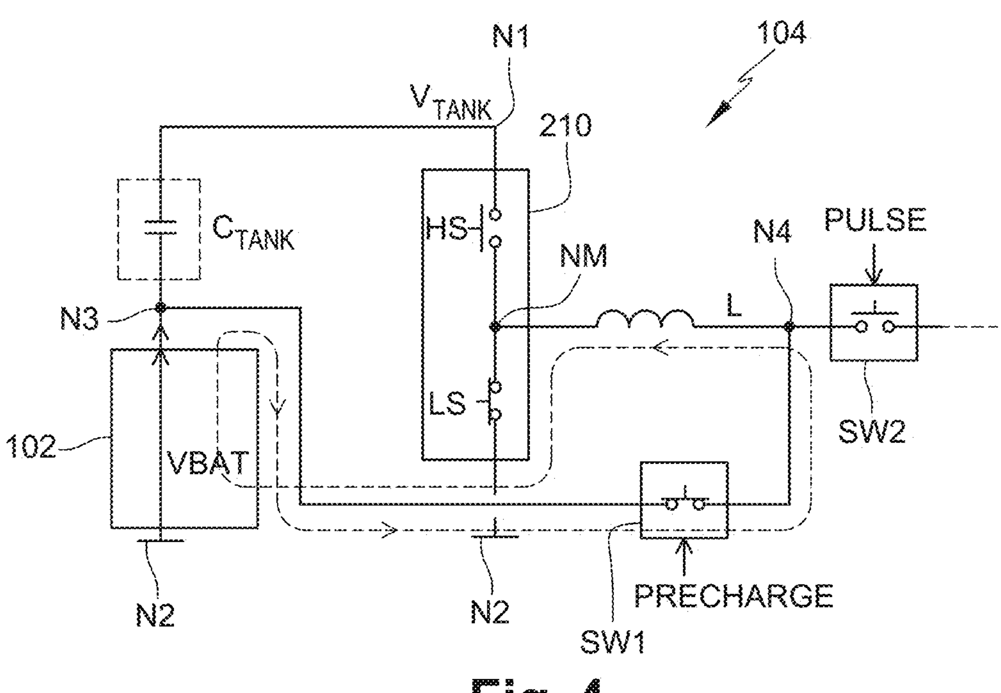
FIG. 4 illustrates a step of a phase of operation of the power conversion circuit of FIG. 2, in accordance with some embodiments.
FIG. 5 illustrates a phase of operation of the power conversion circuit of FIG. 2, in accordance with some embodiments.

FIG. 4 illustrates a step of operation of the power conversion circuit 104 of FIG. 2. The example of FIG. 4 relates to pre-charge phases.

FIG. 5 illustrates another step of operation of the power conversion circuit 104. The example of FIG. 5 relates to pre-charge phases.

FIGS. 4 and 5 illustrate the two switching steps (also called first and second steps) of the pre-charge phase of the capacitor CTANK. During the pre-charge phase, switch SW1 is ON and switch SW2 is OFF.

Compared to the alternating frequency of the pre-charge and powering phases, the switching steps of FIGS. 4 and 5 alternate at a high switching frequency. As an example of embodiment, the switching frequency of alternation of the steps of FIGS. 4 and 5 is greater than the kilohertz, for example at a fixed value comprised between few kilohertz to a Megahertz. In an example, the ratio of the HS and LS switches conduction time is duty-cycle D.

In the step illustrated by FIG. 4, the low-side switch LS of the half-bridge 210 is ON and the high-side switch HS of the branch or half-bridge 210 is OFF. A current loop is formed from the battery 102 through the switch SW1, the inductive element L, the low-side switch LS and ground N2. During this step, a defined portion of the energy provided by the battery 102 is stored in the inductive element L.

In the step illustrated by FIG. 5, the high-side switch HS of the half-bridge 210 is ON and the low-side switch LS of the branch 210 is OFF. A current loop is formed from the inductive element L, through the high-side switch HS, the capacitor CTANK and the switch SW1, to transfer the defined portion of energy stored in the inductive element L during the step of FIG. 4 to the capacitor CTANK.

It signifies that the current is not circulating through VBAT during the step illustrated in FIG. 5. Said otherwise, during the step of FIG. 5, the bottom plate of CTANK connected to the battery node VBAT (N3) implies the current loop excluding the battery. This is not the case for the power conversion circuit 204 of Figure. 3, where inductor current is circulating via the power source 102 during entire pre-charge phase. This signifies that, to achieve identical N1 voltage VTANK (i.e. voltage between nodes N1 and N2), energy (current) required from the power source 102 is lower for the power conversion circuit 104 of FIG. 2, compared to the power conversion circuit 204 of FIG. 3, where the capacitor CTANK is connected to GND. Due to the fact that the inductor current circulates through the power source only during the step illustrated in FIG. 4 corresponding to the portion of time related to D, the battery current during the pre-charge phase is equal to $D^*I_{COIL}$ for the example of FIG. 2. For the example of FIG. 3, it is equal to $I_{COIL}$.

At each alternation of first and second steps, the voltage of the capacitor increases. At the end of the pre-charge phase, the voltage $V_{TANK}$ at the node N1 is preferably higher than the voltage of the power source. As an exemplary embodiment illustrated in FIG. 2, the voltage across the capacitor is greater than 10 volts, for example around 12 volts. Assuming a battery voltage of around 3 volts, the voltage, which is available for the powering phase, is around 15 Volts minus minimal output voltage VOUT. The power conversion device of FIG. 2 operates, during the pre-charge phase, as a boost DC/DC converter to charge the capacitor CTANK.

Figure 6:
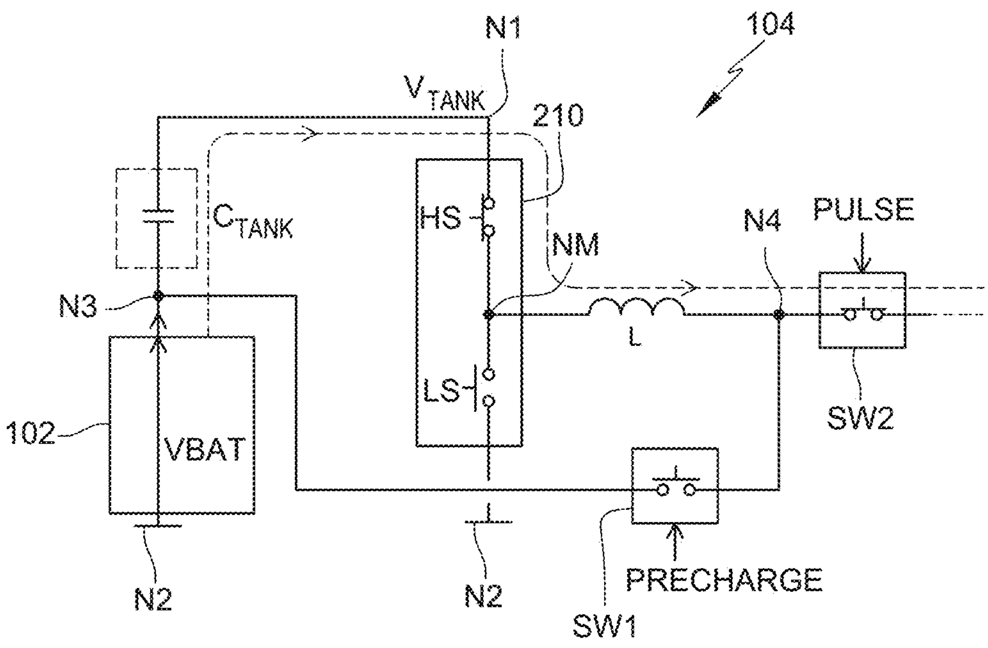
FIG. 6 illustrates another step of a phase of operation of the power conversion circuit of FIG. 2, in accordance with some embodiments.

FIG. 6 illustrates another step of a phase of operation of the power conversion circuit 104 of FIG. 2.

Figure 7:
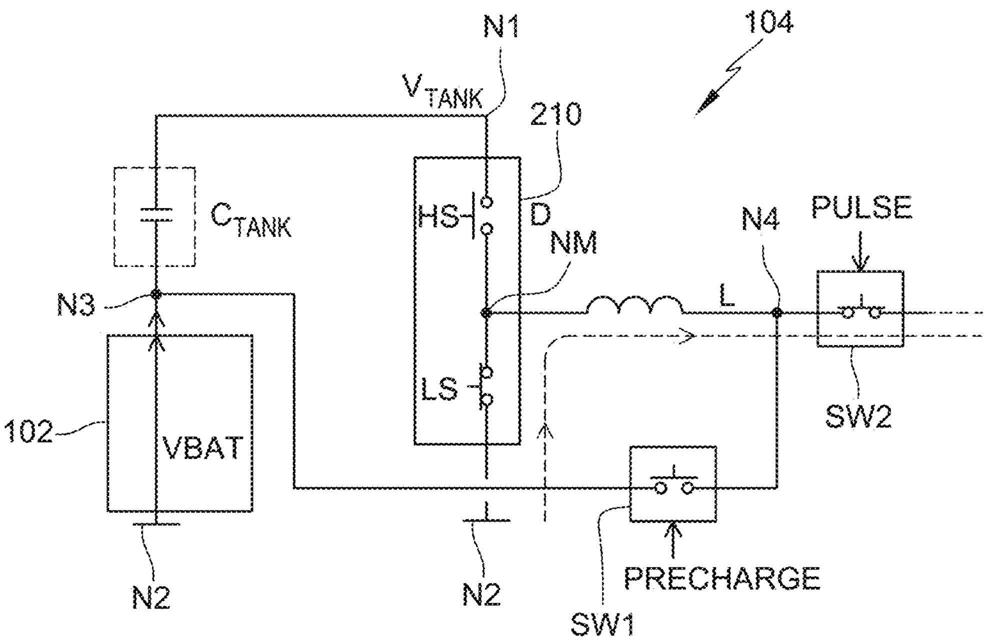
FIG. 7 illustrates another step of a phase of operation of the power conversion circuit of FIG. 2, in accordance with some embodiments.

FIG. 7 illustrates another step of a phase of operation of the power conversion circuit 104 of FIG. 2.

FIGS. 6 and 7 illustrate the two steps (also called third and fourth steps or switching steps) of the powering or output current generation (discharge) phase. During the powering discharge phase, switch SW1 is OFF and switch SW2 is ON.

As for the steps of the pre-charge phase, the steps of FIGS. 6 and 7 alternate at a high frequency as compared to the alternating frequency of the pre-charge and powering phases. In some embodiments, the switching frequency of alternation of the steps of FIGS. 6 and 7 and the duty cycle may preferably be the same as those of the steps of the pre-charge phase. The ratio of the HS and LS switches conduction time is duty-cycle D.

In the step illustrated by FIG. 6, the high-side switch HS of the half-bridge 210 is ON and the low-side switch LS of the half-bridge 210 is OFF. A current loop is formed from the battery 102 through the capacitor CTANK, the high-side switch HS, the inductive element L, the switch SW2, the load (not shown in FIGS. 6 and 7), and ground N2. During this step, a defined portion of energy provided by the battery 102 and the capacitor CTANK is stored in the inductive element L.

In the step illustrated by FIG. 7, the high-side switch HS of the half-bridge 210 is OFF and the low-side switch LS of the half-bridge 210 is ON. A current loop is formed from the inductive element L, through the switch SW2, the load, ground N2 and the low-side switch LS, to transfer the defined portion of energy stored in the inductive element L to the load.

The power conversion circuit 104 of FIG. 2 operates, during the powering phase, as a buck DC/DC converter to transfer the energy accumulated in the capacitor CTANK and available in VBAT to the load. Due to buck operation mode, VOUT voltage is lower than voltage $V_{TANK}$, especially $VOUT=D^*V_{TANK}$. As the inductor current circulates through the power source only during the step of the FIG. 6 corresponding to the portion of time related to D, current delivered by the power source 102 is $IBAT=D^*I_{COIL}$. As in the buck convertor $IOUT=I_{COIL}$, power source 102 current deliver during the discharge phase output current $IBAT=D\cdot IOUT$.

The energy stored in the capacitor CTANK and available in VBAT is released through the periodic switching half-bridge 210 via the inductive element L to the load.

As third and fourth steps alternate, the voltage across the capacitor CTANK decreases, for example linearly.

At the end of the discharge phase of realization from FIG. 2, energy $$E_{discharge} = \frac{1}{2}c_{TANK}\left(V_{TANK(max)}^2 - V_{TANK(min)}^2\right)$$

was transferred from the tank capacitor and battery to the load (considering zero power losses). For the realization from FIG. 3, the power $E_{discharge}$ was entirely transferred from the capacitor CTANK.

Another important difference and advantage of the power conversion circuit 104 of FIG. 2 in comparison to the power conversion circuit 204 of FIG. 3 is that for the capacitor connected to the power source node N3 (FIG. 2), CTANK voltage is lower, and thus energy accumulated in CTANK is lower. Indeed, for a given N1 node voltage VTANK, the energy stored in tank capacitor $$E_{CTANK} = \frac{1}{2}C_{TANK}\left(V_{TANK}^2 - VBAT^2\right)$$

is lower, when comparing to the embodiments of FIG. 3, where the capacitor is connected to GND and store energy $$E_{CTANK} = \frac{1}{2}c_{TANK}V_{TANK}^2.$$

While the energy exchange between the charging and discharging phases are mediated by voltages $V_{TANK}$(min) and $V_{TANK}$(max), the energy accumulated in $C_{TANK}$ during the pre-charge from $V_{TANK}$(min) to $V_{TANK}$(max) for realization from FIG. 2 is $$E_{PRECHARGE} = \frac{1}{2}C_{TANK}\left\{(V_{TANK(max)} - VBAT)^2 - (V_{TANK(min)} - VBAT)^2\right\}$$

i.e. $E_{PRECHARGE}$ is lowered by VBAT. However, the energy delivered to the load is independent on VBAT and is equal for both solutions illustrated in FIG. 2 and FIG. 3 to $$E_{discharge} = \frac{1}{2}C_{TANK}\left(V_{TANK(max)}^2 - V_{TANK(min)}^2\right).$$

For the solution from FIG. 2, the difference between $E_{PRECHARGE}$ and $E_{discharge}$ is referred to as $\Delta E=VBAT\cdot C_{TANK}(V_{TANK(max)}-V_{TANK(min)})$. In order to satisfy the energy conservation for the embodiments illustrated in FIG. 2, the difference of energy ΔE during discharge phase is delivered by the power source 102. This is advantageous as it allows to decrease input current difference (ripple) between discharging (TON) and charging (TOFF) phases. For the embodiments illustrated in FIG. 3, whole energy is delivered by CTANK, i.e.

$$E_{PRECHARGE} = E_{discharge} = \frac{1}{2}c_{TANK}\left(V_{TANK(max)}^2 - V_{TANK(min)}^2\right)$$

and ΔE=0, i.e. zero current is drawn from VBAT during the discharge phase, but higher current is drawn from VBAT during the pre-charge phase.

Figure 8:
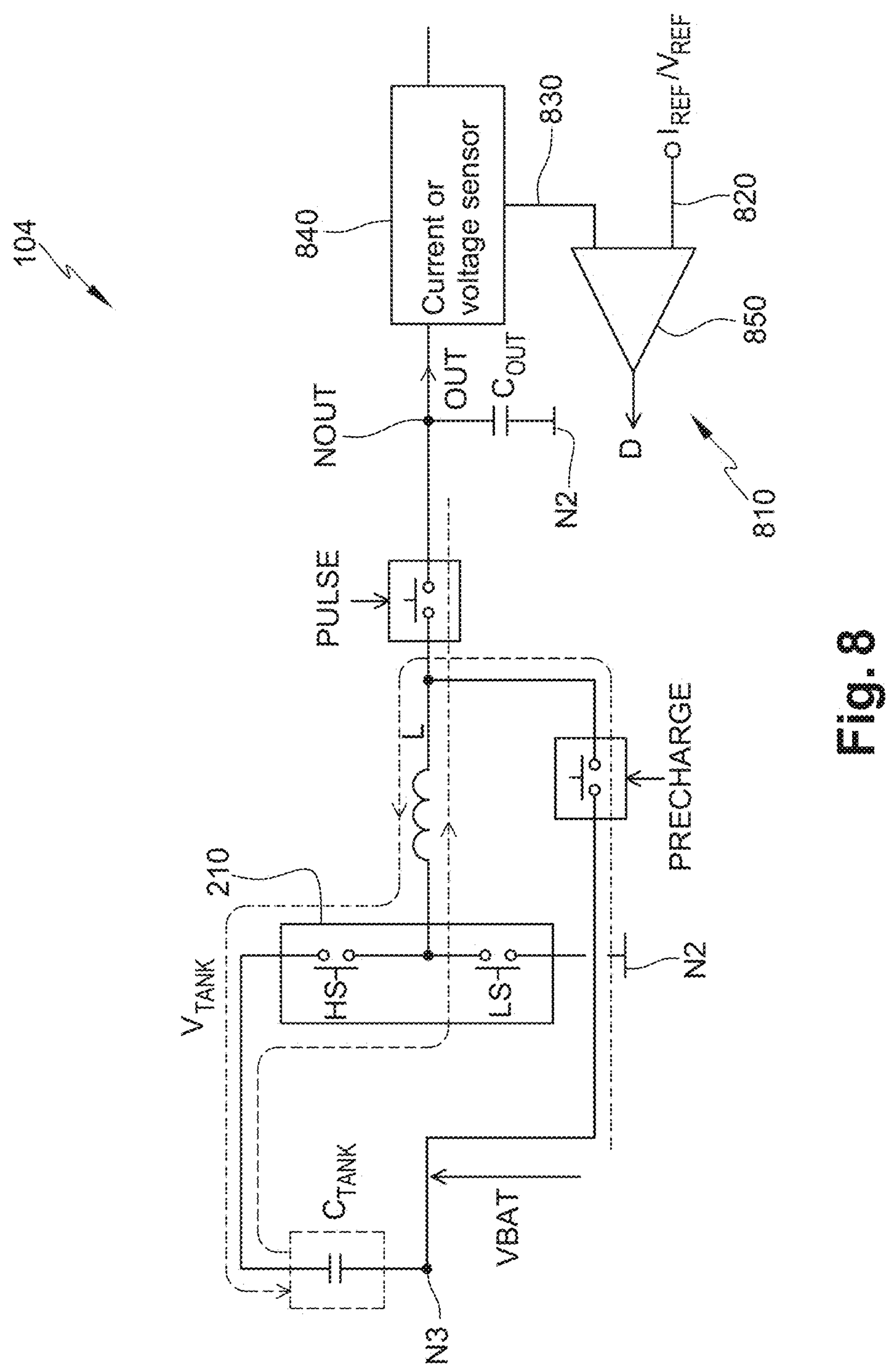
FIG. 8 is a schematic view of a power conversion circuit, in accordance with some embodiments.

FIG. 8 is a schematic view of a power conversion circuit 304 according to one or more embodiments of the present disclosure.

According to the example of FIG. 8, the power conversion 304 comprises a feedback circuit 810 to regulate the operation of the power conversion circuit (the duty cycle of the alternations of the steps during the operating phases) according to the needs or desired operation of the load.

The feedback circuit 810 comprises, for example, a current or voltage sensor 840 (Current or voltage sensor) coupled, and in some embodiments directly electrically connected, to the output node NOUT. The feedback circuit 810 further comprises, for example, a linear regulator (or error amplifier) 850 having a first input 830 coupled, preferably connected, to the current or voltage sensor 840 and a second input 820 receiving a reference voltage or current ($I_{REF}$ or $V_{REF}$).

The feedback circuit 810 is configured to maintain a constant current or voltage delivered by the output node NOUT during the second operating phase by comparing a voltage or a current at the output node NOUT to the reference voltage or current. The feedback circuit 810 is configured to generate control signals to the switches HS, LS. For example, a control signal generated by the linear regulator has a duty cycle D.

Figure 9:
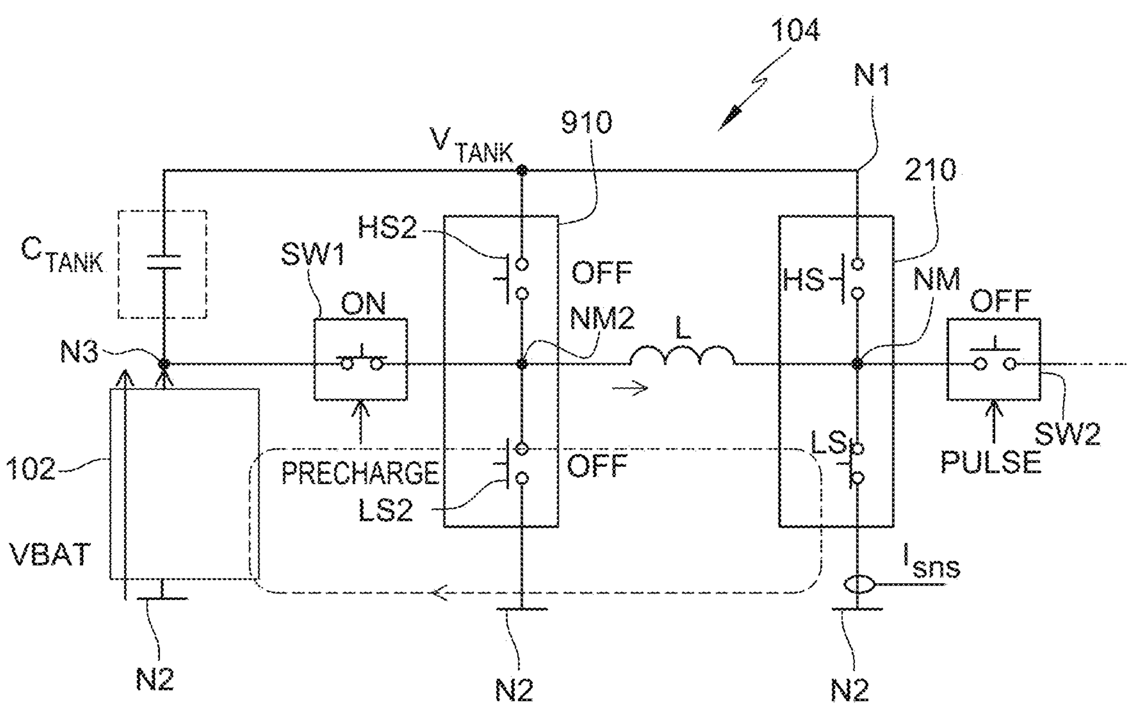
FIG. 9 illustrates a step of a phase of operation of another embodiment of a power conversion circuit, in accordance with some embodiments.

FIG. 9 illustrates a step of operation of another power conversion circuit 404 in accordance with one or more embodiments.

Figure 10:
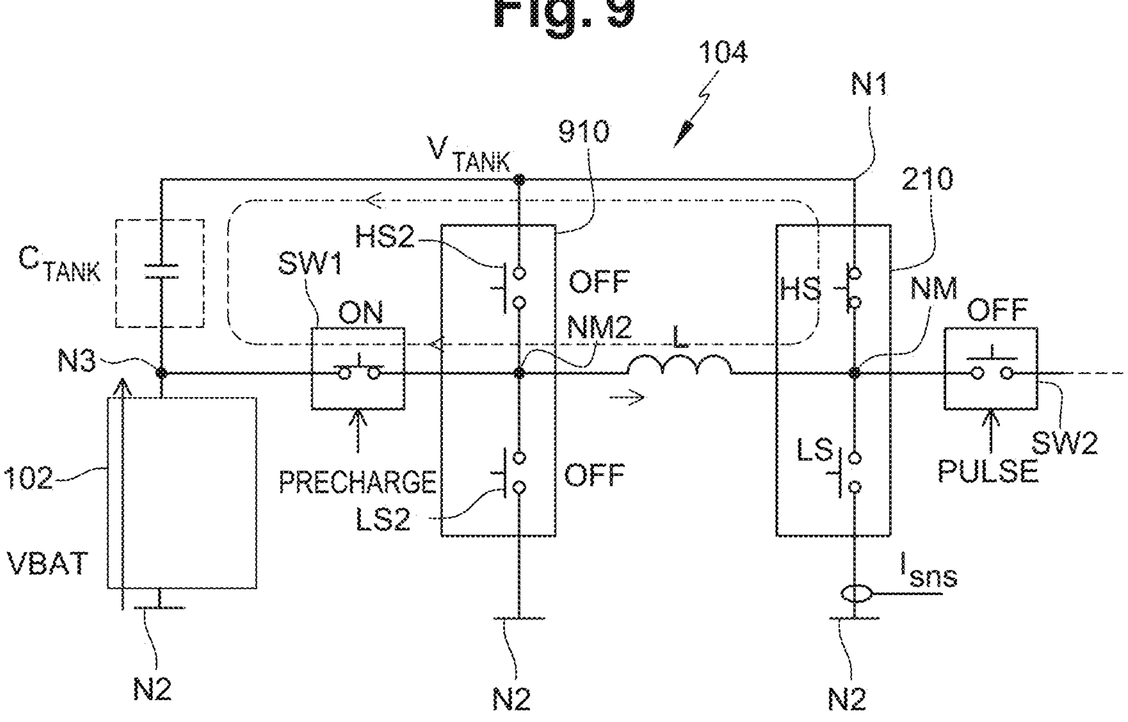
FIG. 10 illustrates another step of a phase of operation of another embodiment of a power conversion circuit, in accordance with some embodiments.

FIG. 10 illustrates another step of operation of the power conversion circuit 404.

Figure 11:
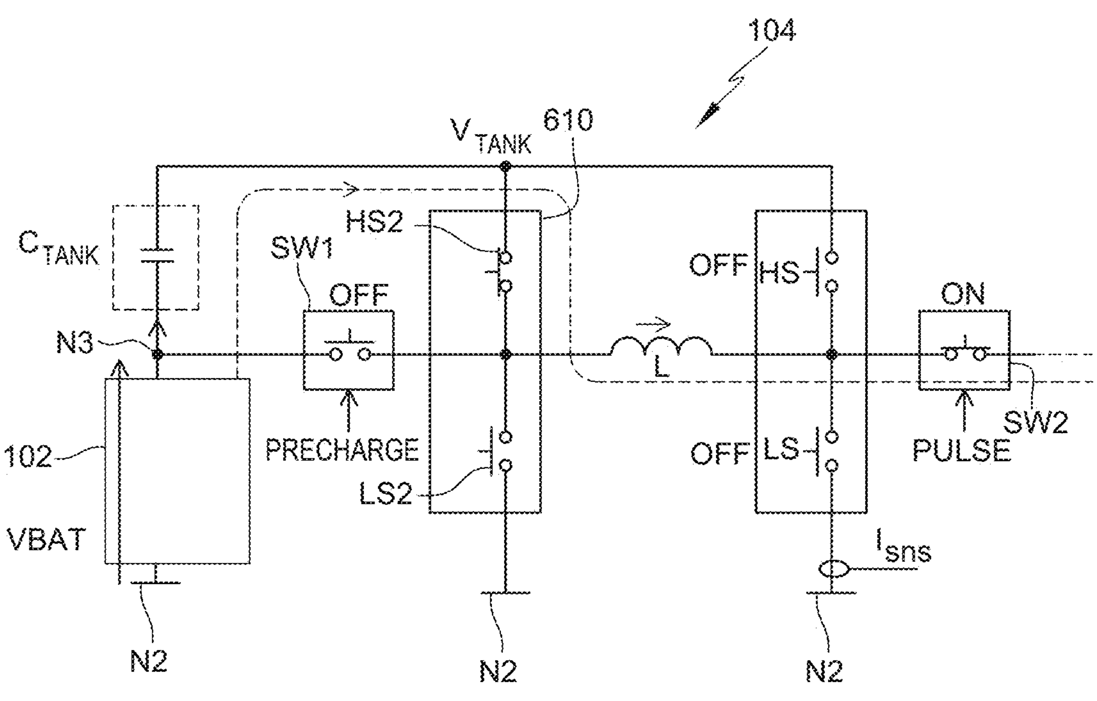
FIG. 11 illustrates another step of a phase of operation of another embodiment of a power conversion circuit, in accordance with some embodiments.

FIG. 11 illustrates another step of operation of the power conversion circuit 404.

Figure 12:
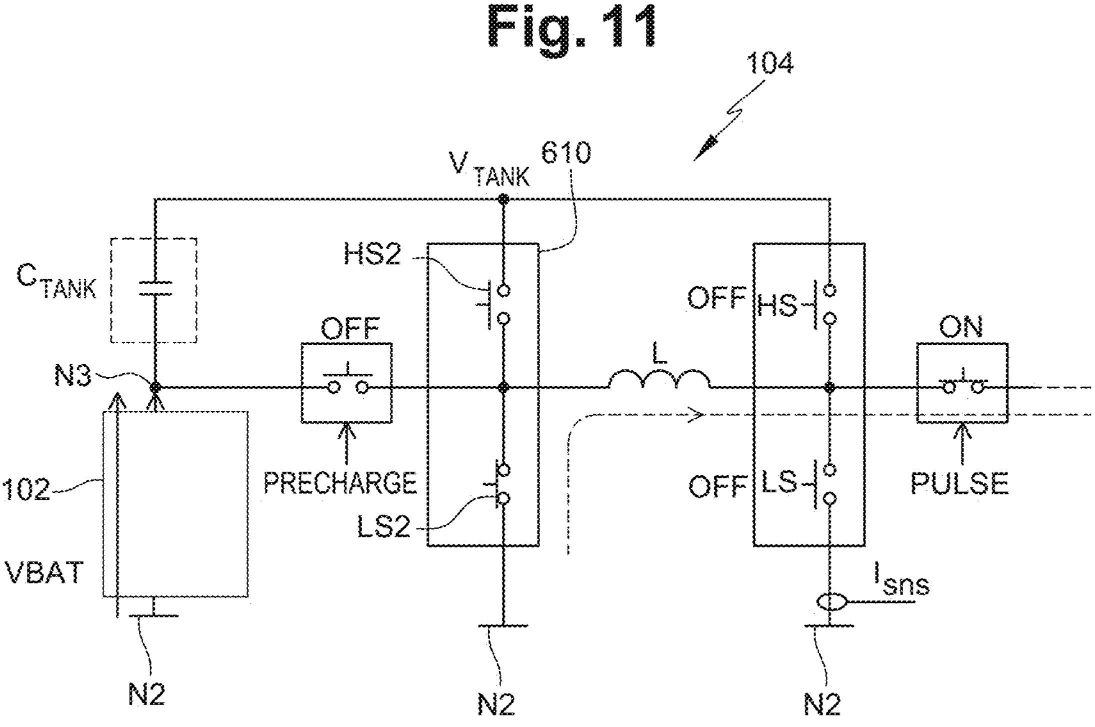
FIG. 12 illustrates another step of a phase of operation of another embodiment of a power conversion circuit, in accordance with some embodiments.

FIG. 12 illustrates another step of operation of the power conversion circuit 404.

According to the example of FIGS. 9 to 12, the respective pre-charge and powering phases use two different half-bridges 210 and 910 of switches in series with the nodes N1 and N2, both sharing a same inductive element L. The two branches 210, 910 and the inductive element L are connected as a H-bridge. The mid-point NM of the branch 210 of switches HS and LS is still coupled, preferably connected to a (first) terminal of the inductive element L. Capacitor CTANK still couples the node N3 for application of a power source voltage to the high-side node N1, but could also be connected to ground node N2. Furthermore, the pre-charge switch SW1 still couples node N3 to the second terminal of the inductive element L. As in the previous embodiment the capacitor CTANK can either be grounded (as in FIG. 3) or connected to node N3 (as in FIG. 2).

The difference between the power conversion circuit 404 of FIGS. 9 to 12 with respect of the power conversion circuits of FIGS. 2 to 8, is, as mentioned above, the provision of a second branch 910 of two switches, respectively high-side HS2 and low-side LS2 (also called fifth and sixth switches), in series between nodes N1 and N2. In the power conversion circuit 404 of FIGS. 9 to 12, a mid-point of the series association of switches HS2 and LS2 is coupled, and in some embodiments directly electrically connected, to the second terminal of the inductive element L, i.e. via switch SW1 to the node N3. Another difference is that the switch SW2 coupling the power conversion circuit 404 to the load (not shown) is connected to the mid-point NM of the branch 210 instead of to the second terminal of the inductive element L. It represents a different implementation of the circuit allowing an alternation of the pre-charge and discharge phases with a single inductive element L.

In operation, the branch 210 is used during the pre-charge phase as boost DC/DC converter and the branch 910 is used during the powering phrase as a buck DC/DC converter. Having said that, the operation is then similar as the one described in relation to the previous embodiments, except that the inductor current direction remains unchanged between pre-charge and discharge phases in the example embodiments of FIGS. 9 to 12.

FIGS. 9 and 10 illustrate the two steps (i.e., the first and second steps) of the pre-charge phases of the capacitor CTANK, during which switch SW1. is ON and switch SW2 is OFF. The half-bridge 910 is not operative and the fifth and sixth switches HS2 and LS2 are OFF.

In the step illustrated by FIG. 9, the low-side switch LS of the branch 210 is ON and the high-side switch HS of the branch 210 is OFF. A current loop is formed from the power source 102 through the switch SW1, the inductive element L, the low-side switch LS and ground N2. During this step, a defined portion of energy provided by the power source 102 is stored in the inductive element L.

In the step illustrated by FIG. 10, the high-side switch HS of the branch 210 is ON and the low-side switch LS of the branch 210 is OFF. A current loop is formed from the inductive element L, through the high-side switch HS, the capacitor CTANK and the switch SW1, to transfer the defined portion of energy stored in the inductive element L during the step of FIG. 9 to the capacitor CTANK.

FIGS. 11 and 12 illustrate the two steps (i.e., the third and fourth steps) of the powering or output current generation phases, during which switch SW2 is ON and switch SW1 is OFF. The half-bridge 210 is not operative and the first and second switches HS and LS are OFF.

In the step illustrated by Figure ii, the high-side switch HS2 of the second half-bridge 910 is ON and the low-side switch LS2 of the second half-bridge 910 is OFF. A current loop is formed from the power source 102 through the capacitor CTANK, the high-side switch HS2, the inductive element L, the switch SW2, the load (not shown in FIGS. 11 and 12), and ground N2. During this step, a defined portion of energy provided by the power source 102 and the capacitor CTANK is stored in the inductive element L.

In the step illustrated by FIG. 12, the high-side switch HS2 of the second half-bridge 910 is OFF and the low-side switch LS2 of the half-bridge 910 is ON. A current loop is formed from the inductive element L, through the switch SW2, the load, ground N2 and the low-side switch LS2, to transfer the defined portion of energy stored in the inductive element L to the load.

Figure 13:
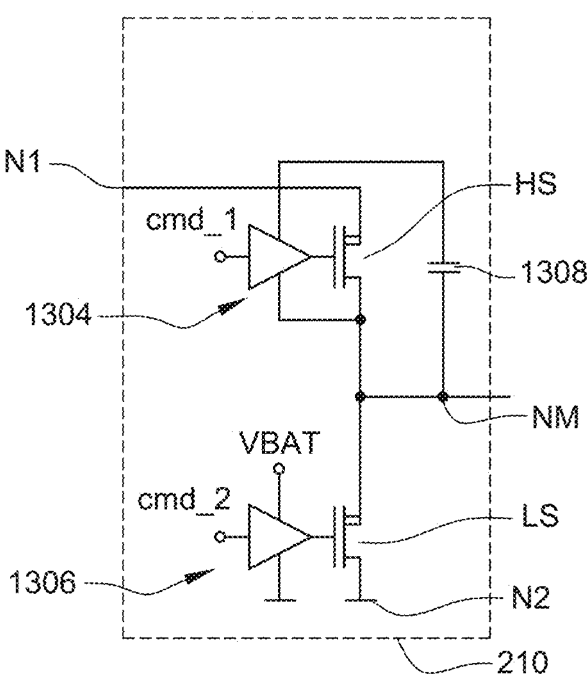
FIG. 13 is a schematic view illustrating details of a power conversion circuit, in accordance with some embodiments.

FIG. 13 is a schematic view illustrating details of a power conversion circuit in accordance with some embodiments. FIG. 13 is a detailed view of a half-bridge of the power conversion circuit.

Figure 14:
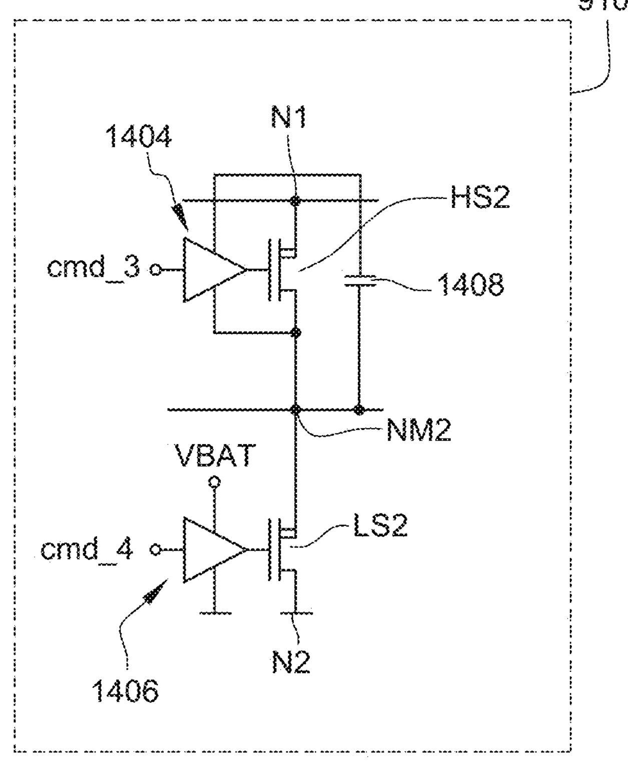
FIG. 14 is a schematic view illustrating further details of a power conversion circuit, in accordance with some embodiments.

FIG. 14 is a schematic view of further details of a power conversion circuit in accordance with some embodiments. FIG. 14 is a detailed view of another half-bridge of the power conversion circuit.

FIGS. 13 and 14 represent exemplary embodiments, respectively of branches 210 and 910 made of MOS transistors. The structures of both branches are similar.

Each switch HS, LS, HS2, LS2 is made, for example, of a PMOS transistor having a source, a drain and a gate, and its body or bulk connected to the source.

The respective sources of transistors HS and HS2 are connected to node N1 and their drain are respectively connected to mid-points NM and NM2. The sources of transistors LS and LS2 are respectively connected to midpoints NM and NM2 and their drains are connected to node N2.

The gate of each transistor HS, LS, HS2, LS2 receives a control signal, respectively cmd_1, cmd_2, cmd_3, and cmd_4, provided by a driver, respectively 1304, 1306, 1404 and 1406. The Low-side drivers 1306 and 1406 are powered for instance by the power source voltage VBAT. The high-side drivers 1304 and 1404 are powered via capacitive elements, respectively 1308 and 1408, coupling the positive powering terminal of drivers 1304 and 1404, to the midpoint, respectively NM and NM2, i.e. the drain of the corresponding transistor to which is connected the negative powering terminal of the driver 1304, 1404. Capacitors 1308 and 1408 are charged during the steps where the corresponding low-side switch is ON.

The respective control signals cmd_1 and cmd_3 of the drivers 1304 and 1404 correspond, for example, to the output D of the linear regulator 850 of FIG. 8, while the control signals cmd_2 and cmd_4 of the drivers 1304 and 1404 correspond, for example to the inverse of the output D of linear regulator 850.

It should be noted that all switches HS, LS, HS2, LS2, SW1 and SW2 are controlled in fully-ON/fully-OFF mode.

Figure 15:
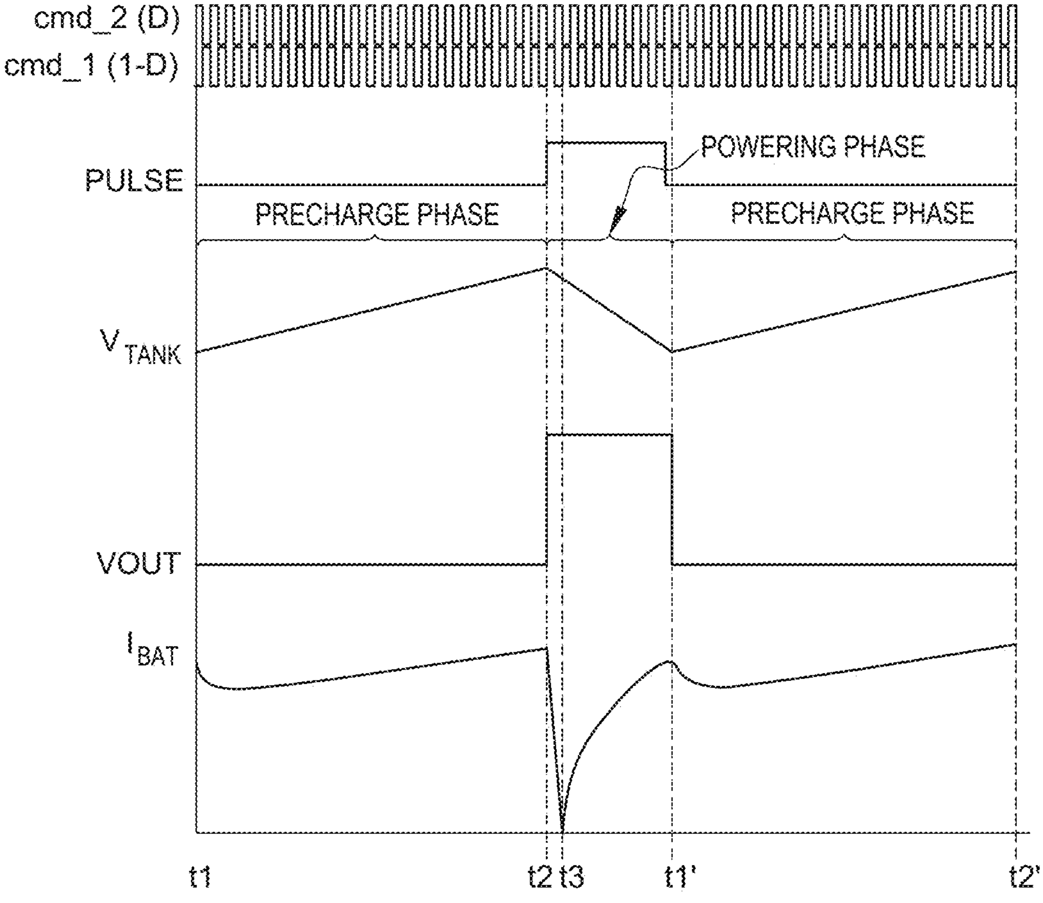
FIG. 15 is a timing diagram illustrating the operating steps of FIG. 4, FIG. 5, FIG. 6 and FIG. 7, in accordance with some embodiments.

FIG. 15 is a timing diagram illustrating the operating steps of FIG. 4, FIG. 5, FIG. 6 and FIG. 7.

FIG. 15 shows examples of signals cmd_2 controlling switch HS, cmd 1 controlling switch LS, PULSE controlling switch SW2, voltage VTANK on node N1, of the voltage VOUT provided to the load and of the current IBAT drawn from the power source, during the pre-charge and powering phases. For sake of clarity, the complementary duty cycle signals are shown for constant D=50% and at a low frequency.

In FIG. 15, two pre-charge phases, between times t1 and t2, respectively t1' and t2', and one powering phase, between times t2 and t1', are shown. In practice, during the circuit operation, tenth, hundreds or thousands or more of pre-charge and powering phases alternate.

Between times t1 and t2, respectively t1' and t2', the signals cmd_2 and cmd_1, controlling switches LS and HS are in pulsed width modulated (PWM) mode in opposite phase 1-D and D. The switch SW2 is OFF and no voltage VOUT is provided and the output. The voltage VTANK progressively increases. The current IBAT drawn from the power source 102 first slightly decreases due to the change of state of the switch SW2 and then increases for example linearly as the voltage VTANK. For instance, the inductor current ICOIL is regulated to be constant during pre-charge phase. If the voltage VTANK exceed maximal allowed value VTANK(max), the charging process is stopped (not shown in FIG. 15).

At time t2, the state of switch SW2 changes from OFF to ON and stays ON during the whole powering phase, until time t1'. During this phase, the signals controlling switches HS and LS are generated by the feedback controller 840. The load being coupled to the capacitor CTANK, it causes the energy stored at the capacitor CTANK to be released to the load via the DC/DC operation through switches HS and LS and inductive element L. This causes the voltage VTANK to decrease until the next pre-charge phase at time t1'. At the beginning of the powering phase, between time t2 and a time t3, the current IBAT drawn from the power source 102 drops due to the opening of switch SW1 and the introduction of the battery in the circuit for the powering phase. The current IBAT then increases progressively and corresponds to $D*I_{COIL}$ until the end of the powering phase. In the embodiments corresponding to FIG. 3, where the bottom plate of CTANK is connected to GND, the current IBAT would be zero.

Thanks to the energy provided by capacitor CTANK and the power source 102, the current provided to the load during the powering phase is stable, and higher than power delivered by the power source 102.

Figure 16:
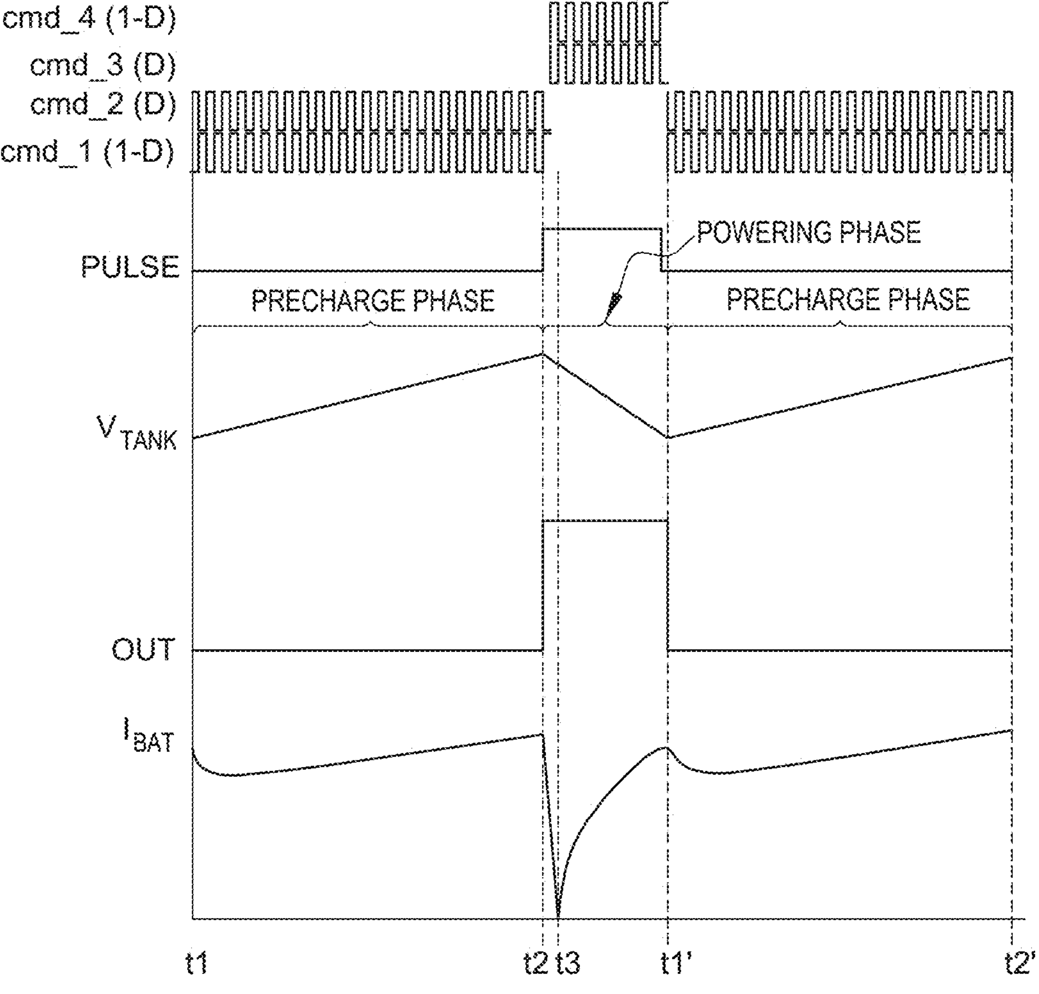
FIG. 16 is a timing diagram illustrating the operating steps of FIG. 9, FIG. 10, FIG. 11 and FIG. 12, in accordance with some embodiments.

FIG. 16 is a timing diagram illustrating the operating steps of FIG. 9, FIG. 10, FIG. 11 and FIG. 12.

The timing diagram of FIG. 16 is similar to the timing diagram of FIG. 15 except that, during the powering phases, the first branch 210 is not operative i.e. control signals cmd_1 and cmd_2 are not active. During the powering phases, the signals controlling the switches HS2, LS2 are the control signals cmd_3 and cmd_4 in pulsed width modulated mode D and 1-D. During the pre-charge phases, the second branch 910 is not operative i.e. the controlling signals cmd_3 and cmd_4 are not active.

Figure 17:
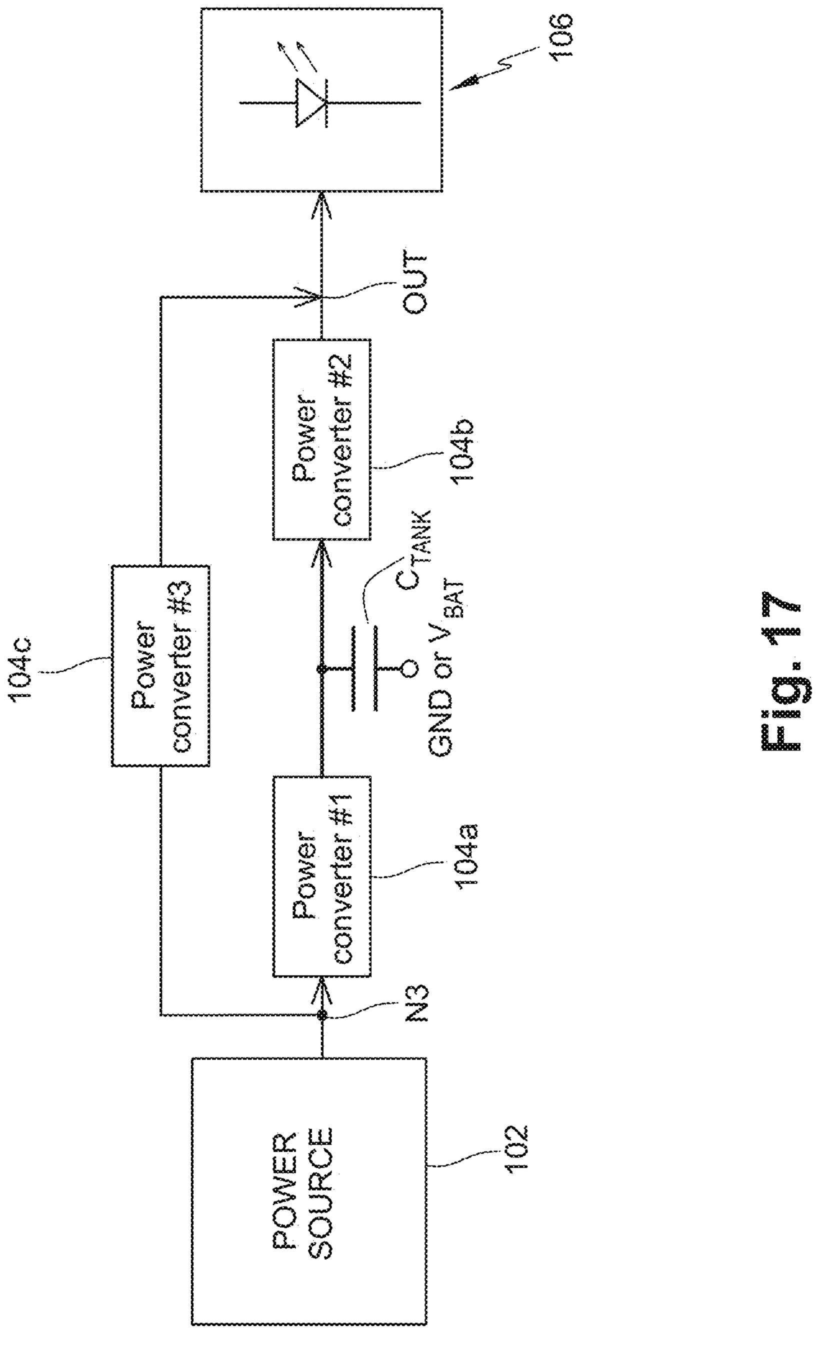
FIG. 17 is a schematic view of an electronic device, in accordance with some embodiments.

FIG. 17 is a schematic view of an electronic device according to one or more embodiments of the present disclosure.

The example of FIG. 17 illustrates that the capacitor CTANK can be associated to several power converters each made of an inductive element and of a half-bridge of switches (FIGS. 2 to 9) or H-bridge (FIGS. 9 to 12).

According to the example FIG. 17:

- a first power converter 104*a* (Power converter #1) couples the power source (node N3) to the first electrode of the capacitor CTANK;
- a second power converter 104*b* (Power converter #2) couples the first electrode of the capacitor CTANK to the output node OUT; and
- a third power converter 104*c* (Power converter #3) couples the power source 102 to the output node, without being connected to the capacitor CTANK.

For instance, power converters #1, #2, #3 can be buck or boost.

The second electrode of the capacitor CTANK is either connected to node N3 (VBAT) or to node N2 (GND).

For instance, power converter #1 is a boost, charging VTANK to a high voltage, while power converter #2 is a buck delivering power to the load during discharging powering phase. Power converter #3, for instance, is providing supplementary power from the battery to the load during the discharge powering phase. This helps to reduce power losses from two serially connected power converters #1 and #2 during discharge powering phase.

Figure 18:
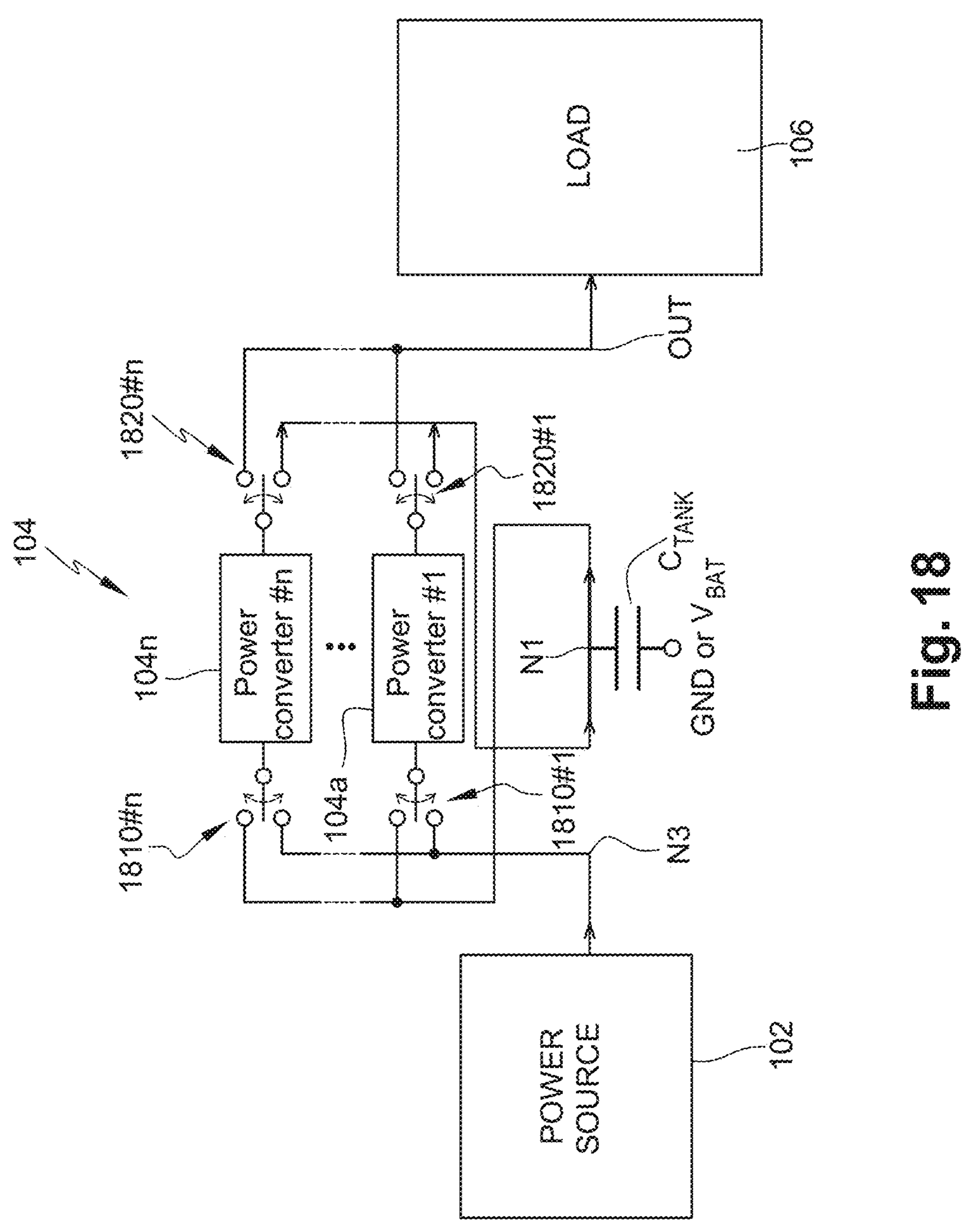
FIG. 18 is a schematic view of an electronic device, in accordance with some embodiments.

FIG. 18 is a schematic view of an electronic device according to another embodiment of the present disclosure.

FIG. 18 illustrates multiple possible combinations and connections of a TANK capacitor between the power source 102 and the load 106, trough one or several power converters, each made of an inductive element and of a half-bridge of switches or H-bridge.

According to the example of FIG. 18, the power conversion circuit 104 comprises n (n being an integer) sets comprising each a power converter 104*a*, . . . , 104*n* (Power converter #1; . . . ; Power converter #n), a switch 1810#n of connection either to node N3 or to the first electrode (node N1) of capacitor CTANK, and a switch 1820#n of connection either to the first electrode of capacitor CTANK or to the output node OUT. The second electrode of the capacitor CTANK is connected either to node N3 (VBAT) or to node N2 (GND).

Various embodiments and variants have been described. Those skilled in the art will understand that certain features of these embodiments can be combined and other variants will readily occur to those skilled in the art. In particular, switches HS, LS, HS2, LS2 can be made of NMOS transistors instead of PMOS. In another example, SW1, SW2 are made of PMOS or NMOS transistor having its body or bulk connected to either the source or the drain in a switchable way. According to another example, the switches SW1, SW2 are made, for example, of PMOS and NMOS transistors in series.

Finally, the practical implementation of the embodiments and variants described herein is within the capabilities of those skilled in the art based on the functional description provided hereinabove. In particular, the generation of appropriate control signals to the power converters and switches of FIGS. 17 and 18 to reproduce the pre-charge and powering phases can be deduced from the operation disclosed in relation with FIGS. 4 to 7 and 9 to 12.

What is claimed is:

1. A power conversion circuit comprising:

a first branch including a first switch and a second switch electrically connected to each other in series between a first node and a second node;

an inductive element having a first terminal connected to a mid-point of the first and the second switches;

a capacitor having a first electrode coupled to the first node;

a third node configured to receive a first voltage, the first voltage being referenced to the second node; and a third switch configured to electrically connect the third node to a second terminal of the inductive element, wherein the third switch is configured to be connected to a power source referenced to the second node; and a second branch including a fourth switch and a fifth switch electrically connected to each other in series between the first node and the second node, wherein, during a first operating phase, the third switch is ON and a first step and a second step alternate at a first frequency.

2. The power conversion circuit of claim 1, wherein a mid-point of the fourth and the fifth switches of the second branch is connected to the second terminal of the inductive element.

3. The circuit of claim 1, wherein the capacitor is coupled to the third node.

4. The circuit of claim 1, wherein at least one of the capacitor or the second node is coupled to a reference potential.

5. The power conversion circuit of claim 1, wherein the first switch is OFF and the second switch is ON during the first step, and wherein the first switch is ON and the second switch is OFF during the second step.

6. The power conversion circuit of claim 1, wherein, during a second operating phase comprising a third step and a fourth step, the third switch is OFF, and wherein the first and the second operating phases alternate at a frequency lower than the first frequency.

7. The power conversion circuit of claim 6, wherein the first and the second switches are controlled in pulse width modulated mode.

8. A method, comprising:

applying a first voltage to a third node of a power conversion circuit, the power conversion circuit including a first branch having a first switch and a second switch electrically coupled to one another in series between a first node and a second node, an inductive element having a first terminal connected to a mid-point of the first and the second switches, and a capacitor having a first electrode coupled to the third node, wherein the first voltage is referenced to the second node;

electrically connecting, by a third switch, the third node to a second terminal of the inductive element, the third switch being connected to a power source referenced to the second node; and electrically connecting a fourth switch and a fifth switch to each other in series between the first node and the second node, a second branch of the power conversion circuit including the fourth switch and the fifth switch, wherein, during a first operating phase, the third switch is ON and a first step and a second step alternate at a first frequency.

9. The method of claim 8, wherein the first switch is OFF and the second switch is ON during the first step; and the first switch is ON and the second switch is OFF during the second step.

10. The method of claim 8, wherein during a second operating phase comprising a third step and a fourth step, the third switch is OFF; and the first and the second operating phases alternate at a frequency lower than the first frequency.

11. The method of claim 10, wherein the first and the second switches are controlled in pulse width modulated mode.

12. The method of claim 10, wherein:

during the third step, the first switch is ON and the second switch is OFF; and during the fourth step, the first switch is OFF and the second switch is ON.

13. The method of claim 10, wherein:

during the first operating phase, the fourth and the fifth switches are OFF;

during the second operating phase, the first and the second switches are OFF;

the fourth switch is ON and the fifth switch is OFF during the third step; and the fifth switch is ON and the fourth switch is OFF during the fourth step.

14. The method of claim 10, further comprising controlling an output switch to selectively couple the inductive element to an output node.

15. The method of claim 14, wherein the output switch is:

OFF during the first operating phase; and

ON during the second operating phase.

16. The method of claim 14, wherein the power conversion circuit comprises a feedback circuit connected to the output node, the method further comprising maintain, by the feedback circuit, a constant current in the inductive element during the second operating phase by comparing a voltage or a current at the output node to a reference and provide a control signal to the first and the second switches.

17. The method of claim 14, wherein the power conversion circuit comprises a feedback circuit connected to the output node, the method further comprising maintaining, by the feedback circuit, a constant current in the inductive element during the second operating phase by comparing a voltage or a current at the output node to a reference and provide a control signal to the fourth and the fifth switches.

18. The method of claim 8, wherein during the first step the first switch is OFF and the second switch is ON, and during the second step the first switch is ON and the second switch is OFF.

19. An electronic device comprising:

a power source configured to supply a first voltage;

a load; and a power conversion circuit including:

a first branch including a first switch and a second switch electrically connected to each other in series between a first node and a second node, an inductive element having a first terminal connected to a mid-point of the first and the second switches, a capacitor having a first electrode coupled to the first node, a third node configured to receive the first voltage, the first voltage being referenced to the second node, a third switch configured to electrically connect the third node to a second terminal of the inductive element, the third switch being configured to be connected to the power source referenced to the second node, and a second branch including a fourth switch and a fifth switch electrically connected to each other in series between the first node and the second node, wherein the power source is configured to apply the first voltage to the third node, and the load is connected to an output node of the power conversion circuit, and wherein, during a first operating phase, the third switch is ON and a first step and a second step alternate at a first frequency.

20. The electronic device of claim 19, wherein the power source comprises a battery.

* * * * *